United States Patent [19]

Murphy

[11] Patent Number: 5,233,358
[45] Date of Patent: Aug. 3, 1993

[54] ANTENNA BEAM FORMING SYSTEM

[75] Inventor: Timothy A. Murphy, Lynnwood, Wash.

[73] Assignee: Hughes Aircraft Company, Los Angeles, Calif.

[21] Appl. No.: 342,266

[22] Filed: Apr. 24, 1989

[51] Int. Cl.$^5$ ............................................. H01Q 3/22
[52] U.S. Cl. .................................... 342/375; 342/371
[58] Field of Search ............... 342/373, 371, 372, 375, 342/368, 383, 157; 55/1

[56] References Cited

U.S. PATENT DOCUMENTS

| | | | |
|---|---|---|---|
| 4,072,956 | 2/1978 | Provencher | 343/844 |
| 4,638,317 | 1/1987 | Evans | 342/373 |
| 4,721,960 | 1/1988 | Lait | 342/368 |

OTHER PUBLICATIONS

Shelton, "Fast Fourier Transforms and Butler Matrices" Proceedings of the IEEE, Mar. 1968, p. 350.

*Primary Examiner*—Gregory C. Issing
*Attorney, Agent, or Firm*—William J. Streeter; Wanda K. Denson-Low

[57] ABSTRACT

An improved antenna beam forming system 10 for generating a set of directed beams wherein each beam may include carrier signals of more than one frequency is disclosed herein. The improved beam forming system of the present invention includes a first beam forming network 20 for providing a first set of signals. The first beam forming network 20 includes a plurality of phase shifting elements 22 for providing a first phase relationship among the first set of signals in response to first carrier signal of a first frequency. The system 10 of the present invention further includes a second beam forming network 30 for providing a second set of signals. The second beam forming network includes a plurality of phase shifting elements 32 for again providing the first phase relationship among the second set of signals in response to a second carrier signal of a second frequency. An array of summing elements 40 for summing respective signals of the first and second sets of signals is included to provide a third set of signals. The third set of signals is transmitted by a phased array antenna 60 thereby providing first and second contemporaneous beams which overlap at a common surface.

5 Claims, 7 Drawing Sheets

| FROM BFN 1' ⟶ | $f_1$ | $f_2$ | $f_3$ | $f_4$ |
| FROM BFN 2' ⟶ | $f_2$ | $f_3$ | $f_4$ | $f_1$ |
| FROM BFN 3' ⟶ | $f_3$ | $f_4$ | $f_1$ | $f_2$ |
| FROM BFN 4' ⟶ | $f_4$ | $f_1$ | $f_2$ | $f_3$ |

ANTENNA BEAM FORMING SYSTEM

BACKGROUND OF THE INVENTION

1. Field of the Invention

The present invention relates to antenna systems. More specifically, the present invention relates to techniques for controlling the scan of an antenna beam.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Satellite systems are currently utilized for communication between potentially distant points on the surface of the earth. For example, some telephone networks now employ such systems to facilitate communication between widely spaced mobile users. In certain such satellite communication systems a satellite is held in a geosynchronous earth orbit to provide service to a fixed coverage area. These geosynchronous satellites often include an antenna having sufficient beamwidth to encompass the entire coverage area.

However, wide beamwidth systems such as that mentioned above generally include certain undesirable features. For instance, the output power of the satellite may be insufficient to adequately illuminate large coverage regions. This situation may be partially remedied by including more powerful amplifiers on board the satellite for providing increased power to radiating elements of a satellite antenna. However, as is well known, such enhancements to power amplifiers typically increase the cost and physical dimensions thereof. In turn, these enhancements increase the cost of constructing and launching the satellite.

Moreover, wide beamwidth systems typically employ at least two overlapping individual beams to provide the requisite coverage. As a consequence, additional large reflectors are typically deployed on the satellite to direct the individual beams. However, as mentioned above economic concerns encourage reductions in physical dimensions of the satellite. Accordingly, inclusion of the aforementioned reflectors within the satellite is often economically undesirable.

As discussed below, alternative systems which address the difficulties associated with conventional wide beamwidth antennas have recently been proposed.

For example, commonly assigned, (copending) U.S. patent application Ser. No. 782,770 filed Oct. 1, 1985 abandoned Apr. 11, 1989, in the name of H. A. Rosen and entitled STEERED-BEAM SATELLITE COMMUNICATION SYSTEM, which is incorporated herein by reference, discloses a system for communicating via satellite between ground stations. The steered-beam satellite communication system disclosed overcomes certain of the above described limitations present in conventional wide beamwidth satellite systems. The steered-beam system provides a plurality of narrowly focused "virtual" beams targeted at individual ground stations on the surface of the earth. Each virtual beam includes, and is steered by, a carrier signal of a particular frequency. The ground stations then each provide coverage over a portion of the remainder of the geographical area to be serviced. In this manner the output power of a satellite generating these narrow beams is used more efficiently by being directed only to specific regions within a coverage area.

However, the Rosen system does not offer accessibility to the entire frequency band of the satellite from a particular region within the coverage area. That is, only a range of frequencies immediately surrounding the frequency of a carrier signal included within a virtual beam is available to a user positioned within the beam. Hence, the number of users capable of being serviced within a given area is limited by the portion of the satellite frequency spectrum available within the area.

Moreover, for the Rosen system to operate at maximum capacity the distribution of ground stations (users) must be known prior to launch of the satellite. This requirement follows as a consequence of the fact that hardware (a beam forming network) responsible for steering the virtual beams from the satellite may not be modified after launch. This beam forming network is adjusted prior to launch such that the virtual beams generated by the satellite are spatially distributed in accordance with the location of the ground stations on the surface of the earth. Thus, a decrease in system capacity results if the locations of ground stations are changed after satellite launch.

An alternative steered-beam antenna system offering certain improvements over the Rosen system is disclosed in commonly assigned, (copending) U.S. Patent No. 4,882,588 filed Dec. 22, 1986 in the names of Ken H. Renshaw and Timothy A. Murphy and is entitled STEERABLE BEAM ANTENNA SYSTEM USING BUTLER MATRIX, which is incorporated herein by reference. Operationally, the Butler matrix antenna system is substantially similar to the antenna system within the Rosen system. That is, in both systems application of a known spectrum of frequencies to a beam forming network results in generation of a set of virtual beams having a predetermined spatial distribution. Structurally, the above systems differ in that a Butler matrix has been substituted for a subreflector element included within a parabolic reflector arrangement in the system of Rosen. This substitution allows deployment, on a satellite utilizing the Butler matrix antenna system, of a more compact antenna reflector arrangement.

However, the Butler matrix system retains a number of the limitations inherent to the Rosen system. For example, again only a portion of the satellite frequency spectrum is available to a user within a given region. As discussed above with reference to the Rosen system, this lack of accessibility to the entire frequency spectrum from a given location may limit the utility of the Butler matrix system in certain applications. That is, in applications having uncertain future distributions of ground stations maximum user capacity may not be attainable.

Hence, a need in the art exists for an antenna beam forming system for generating a set of directed beams wherein each beam may include carrier signals of more than one frequency. Further, it is desired that such a system be able to operate in conjunction with a Butler matrix.

SUMMARY OF THE INVENTION

The need in the art for an antenna beam forming system for generating a set of directed beams wherein each beam may include carrier signals of more than one frequency is addressed by the improved antenna beam forming system of the present invention. The improved beam forming system of the present invention includes a first beam forming network for providing a first set of signals. The first beam forming network includes first phase shifting means for providing a first phase relationship among the first set of signals in response to a first carrier signal of a first frequency. The system of the present invention further includes a second beam forming network for providing a second set of signals. The second beam forming network includes second phase shifting means for providing the first phase relationship among the second set of signals in response to a second carrier signal of a second frequency. A means for summing respective signals of the first and second sets of signals is included to provide a third set of signals. The third set of signals is transmitted by a phased array antenna thereby providing first and second contemporaneous beams which overlap at a common surface and which include the first and second carrier signals, respectively.

DETAILED DESCRIPTION OF THE INVENTION

Figure 1:
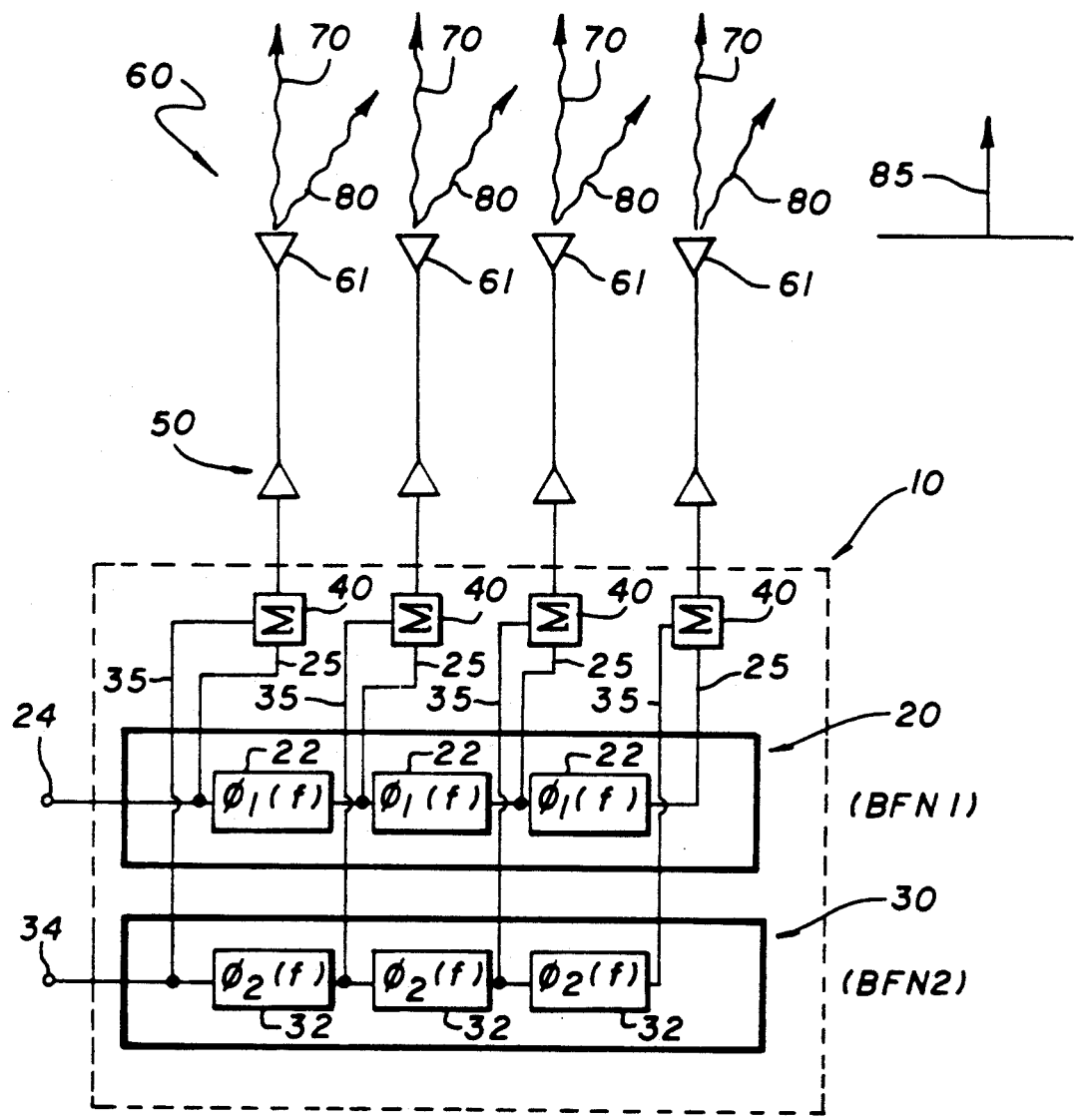
FIG. 1 is a block diagram representing an antenna system which includes a preferred embodiment of the improved antenna beam forming system of the present invention.

FIG. 1 shows a block diagram of a preferred embodiment of the improved antenna beam forming system 10 of the present invention. The system 10 of the present invention includes a first beam forming network 20 (BFN1) and a second beam forming network 30 (BFN2). The first and second beam forming networks 20 and 30 include first and second delay elements 22 and 32, respectively. As is discussed more fully below, in a transmit mode the networks 20 and 30 generate first and second sets of signals in response to the impression of first and second carrier signals upon first and second input terminals 24 and 34, respectively. These first and second sets of signals propagate along signal lines 25 and 35 to an array of summing elements 40. Respective signals from the first and second sets of signals are then combined within the summing elements 40 thereby forming a third set of signals. The third set of signals feeds an array of amplifying elements 50 which drive an antenna array 60. The antenna array 60 then emits first and second virtual beams 70 and 80. The beams 70 and 80 carry information included in modulation present on the first and second carrier signals. Although in FIG. 1 the antenna array 60 is a four-element array, the antenna beam forming network 10 may be adapted for use in conjunction with antenna arrays of any size. Moreover, the directly radiating system of FIG. 1 requires no auxiliary reflector.

The regions illuminated within a coverage area by the first and second virtual beams 70 and 80 may be controlled by adjustment of the frequencies of the carrier signals impressed upon the terminals 24 and 34. As discussed below, the frequency response of the delay elements 22 and 32 may be designed such that the virtual beams 70 and 80 are coincident when the frequencies of carrier signals applied to the terminals 22 and 32 differ by a specified amount. In this manner the beam forming system 10 of the present invention allows more than one virtual beam to be directed at a particular location, thus allowing a user positioned therein access to more than one carrier frequency.

As shown in FIG. 1, the elements 61 within the antenna array 60 may be used both for radiating and receiving electromagnetic energy. The elements 61 may be of a conventional or suitable design, such as a cup dipole radiator.

The delay elements 22 and 32 may be realized by frequency dependent phase shifting elements such as all-pass networks or time delays. As is well known, signals passing through all-pass networks are shifted in phase but unaffected in magnitude. The delay elements 22 and 32 are utilized in controlling the direction of the beams 70 and 80 by providing a progressive time delay into the signals fed the array 60. This progressive time delay induces a difference in the phases of radiation emitted by adjacent elements 61 within the array 60. This phase difference is proportional to the frequency of the carrier signal associated with the beam 70 or 80. The elements 22 and 32 are located ahead of the array of amplifying elements 50 so as to operate at relatively low power and thereby minimize power loss. In addition, amplitude tapering can be introduced in the beam forming process by adjusting the electromagnetic coupling between the phase shifting elements.

As an example of the operation of the first beam forming network 20, consider a carrier signal impressed upon the input terminal 24. This carrier signal is sequentially delayed by each of the delay elements 22. The elements 22 provide a phase increment between signals supplied to adjacent array elements 61 that is proportional to the frequency of the impressed carrier signal. When this incremental phase shift is 360 degrees, the wavefront of the beam 70 propagates in a direction 85 normal to the plane of the array 60. Increasing the frequency of the carrier impressed on the terminal 24 produces a greater incremental phase shift and the beam 70 is directed to the right of the normal 85. Similarly, decreasing the carrier frequency drives the beam 70 to the left of the normal 85. The above explanation of transmit mode operation assumes an outgoing wavefront, it being understood that receive mode operation of the array 60 is reciprocal so that the explanation applies equally well to an incoming wavefront.

Figure 2:
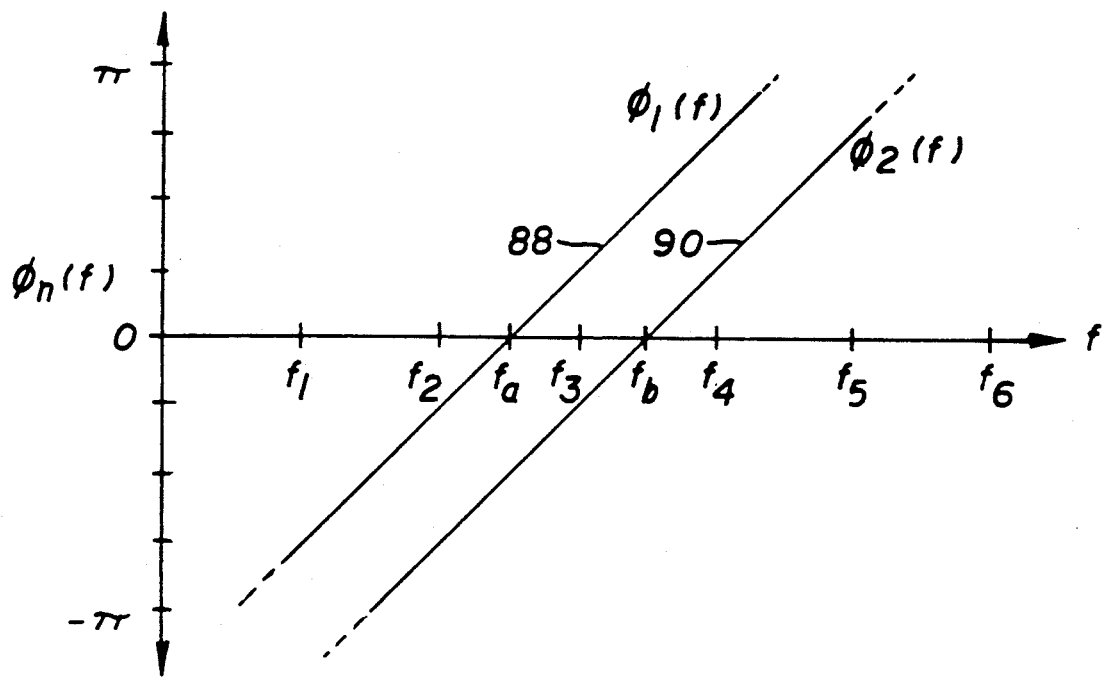
FIG. 2 is a graphical representation of the phase difference between adjacent ports as a function of frequency provided by the delay elements included within the beam forming networks in the embodiment of FIG. 1.

As mentioned above, the frequency response of the delay elements 22 and 32 may be adjusted such that when carrier signals separated in frequency by a specified amount are impressed upon the terminals 24 and 34 the beams 70 and 80 become coincident. FIG. 2 is an example of a pair of phase characteristics for the elements 22 and 32 which allows coincidence of the beams 70 and 80 as described above. As shown in FIG. 2, the delay elements 22 and 32 have phase characteristics $\phi_1(f)$ and $\phi_2(f)$, respectively, which are substantially parallel and offset in frequency.

FIG. 2 may be more readily understood by considering the case when a first carrier signal of frequency $f_a$ is applied to the first beam forming network 20 and a second carrier signal of frequency $f_b$ is applied to the second beam forming network 30. As is evident upon inspection of FIG. 2, the delay elements 22 and 32 within the networks 20 and 30 will provide identical phase shifts (0 radians) to carrier signals $f_a$ and $f_b$. Since the elements 22 and 32 yield the same phase shift at the frequencies $f_a$ and $f_b$, the first and second sets of signals supplied to the array of summing elements 40 by the networks 20 and 30 will have identical phase relationships. Hence, the beams 70 and 80 generated in response to these first and second sets of signals will be substantially coincident. In this manner when carrier signals having a frequency differential of $f_b - f_a$ are impressed upon the terminals 34 and 24, the beams 80 and 70 generated in response thereto will be focused upon substantially the same region within a coverage area.

Figure 3:
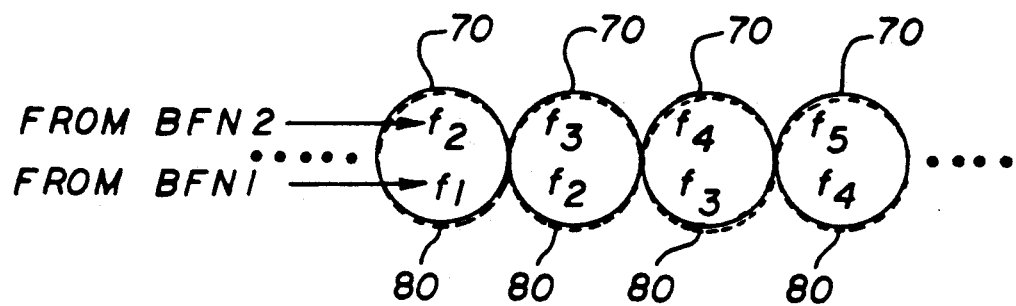
FIG. 3 is an illustrative representation of a set of beam footprints formed upon illumination of a coverage area by a set virtual beams.

FIG. 3 is an illustrative representation of "footprints" of sets of the beams 70 and 80 as they would appear upon illumination of particular regions within a given coverage area. Specifically, the beams 70 and 80 shown in FIG. 3 are generated in response to the simultaneous impression of sets of carrier signals upon the terminals 24 and 34, respectively. In the embodiment of FIG. 3, footprints corresponding to the beams 70 and 80 supported by carrier signals of frequency $f_1$, $f_2$, $f_3$, $f_4$ and $f_5$ are shown. Further, the frequencies $f_1$ through $f_5$ are uniformly spaced by $f_b - f_a$. In the more general case, a continuum of carrier frequencies would be applied to the networks 20 and 30 and the footprints corresponding to adjacent frequencies would substantially overlap. Each frequency does, however, retain its own unique footprint. As can be seen from FIG. 3, the beams 70 and 80 are coincident when carrier signals differing in frequency by $f_b - f_a$ are simultaneously applied to the networks 20 and 30. For example, at the far left of FIG. 3 the footprints of the beams 70 and 80 are coincident when carrier signals of frequency $f_1$ and $f_2$ are applied to the networks 20 and 30, respectively. As a consequence, both of the carrier frequencies $f_2$ and $f_1$ would be available to a user positioned within these coincident footprints. Again, if a continuum of carrier signals had been applied to the networks 20 and 30, those frequencies in the vicinity of $f_1$ and $f_2$ would also be available to such a user.

Figure 4:
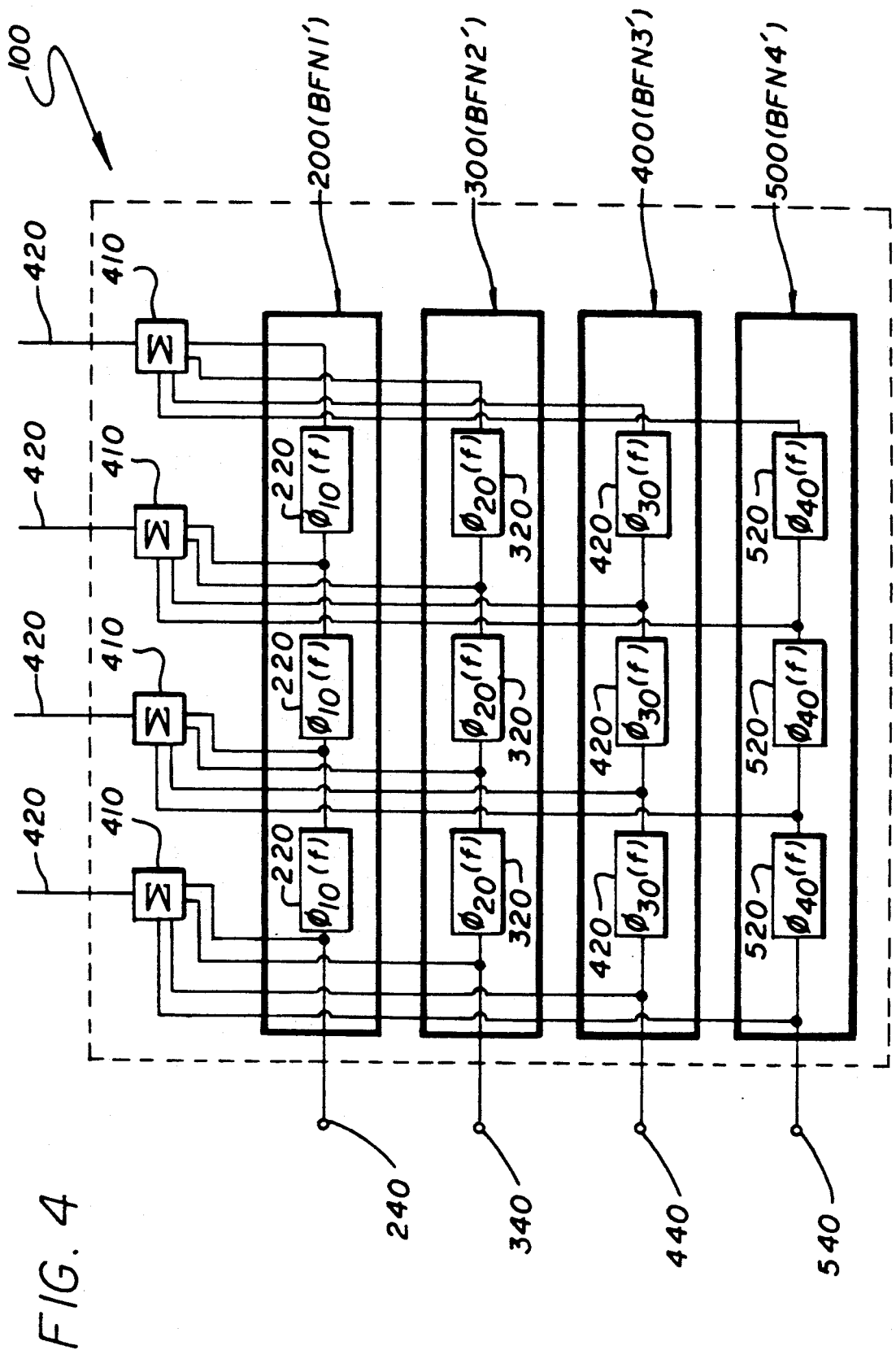
FIG. 4 is a block diagram representation of a preferred embodiment of the improved antenna beam forming system of the present invention having four beam forming networks.

It may now be apparent that the system 10 shown in FIG. 1 may be augmented to allow a desired number of virtual beam footprints to jointly illuminate a specified region within a coverage area. For example, FIG. 4 shows such an augmented embodiment of the improved beam forming system 100 of the present invention. As shown in FIG. 4, the system 100 includes first, second, third and fourth beam forming networks 200 (BFN1'), 300 (BFN2'), 400 (BFN3') and 500 (BFN4'). The networks 200, 300, 400 and 500 include delay elements 220, 320, 420 and 520, respectively. Further, the networks 200, 300, 400 and 500 are connected in parallel to an array of summing elements 410. The elements 410 are substantially identical to the elements 40 of FIG. 1 and may be externally accessed via signal lines 420.

Figure 5:
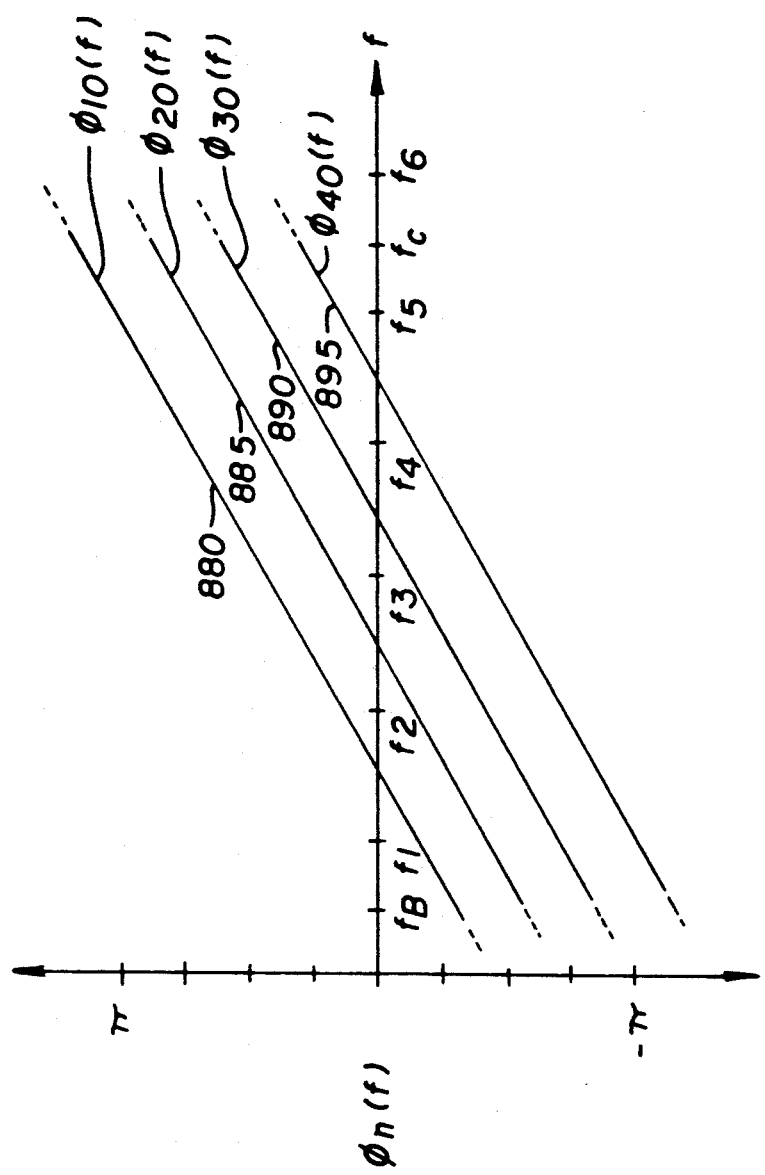
FIG. 5 is a graphical representation of the phase difference between adjacent ports as a function of frequency provided by the delay elements included within the beam forming networks in the embodiment of FIG. 4.

Operation of the system 100 of FIG. 4 is substantially similar to operation of the system 10 in FIG. 1. That is, impression of a set of four carrier signals upon the terminals 240, 340, 440 and 540 will result in the emission of four virtual beams by the array 60. The frequency response characteristics of the delay elements 220, 320, 420 and 520 may be chosen such that virtual beams generated in response to carrier signals applied to the networks 200, 300, 400 and 500 may be directed to a common region within a coverage area. In this manner a user positioned within this common region would have access to a plurality of the carrier signals applied separately to the networks 200, 300, 400 and 500. As shown in FIG. 5, the elements 200, 300, 400 and 500 have phase responses $\phi_{10}(f)$, $\phi_{20}(f)$, $\phi_{30}(f)$ and $\phi_{40}(f)$, respectively.

Figure 6:
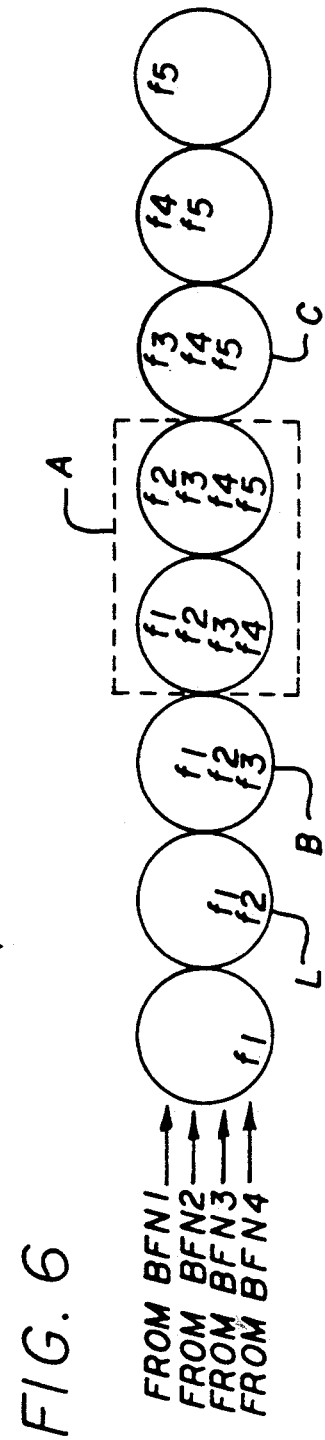
FIG. 6 is an illustrative representation of a virtual beam footprint pattern generated by beams produced by an antenna system having delay elements with the phase response of FIG. 5.

FIG. 6 shows the distribution of virtual beam footprints which would be obtained upon application of a set of carrier signals having frequencies $f_1$, $f_2$, $f_3$, $f_4$, and $f_5$ to each of the terminals 240, 340, 440 and 540 of the system 100 shown in FIG. 4. As is evident upon inspection of FIG. 6, a user positioned within either of the footprints included within the area A would have access to four of the five frequencies $f_1$ through $f_5$ Moreover, if access to more than three carrier frequencies is desired by a user located at positions B or C, additional beam forming networks may be included within the system 100. Nonetheless, in some instances it may be desired that users positioned within beam footprints included within the areas A, B and C have uniform access to the same four frequencies (e.g. the frequencies $f_1$, $f_2$, $f_3$ and $f_4$) with only four beam forming networks 200, 300, 400 and 500 included within the system 100. As is discussed below, an alternative implementation of the system 100 in conjunction with a Butler matrix and a suitable reflector allows such uniform carrier frequency access.

Figure 7:
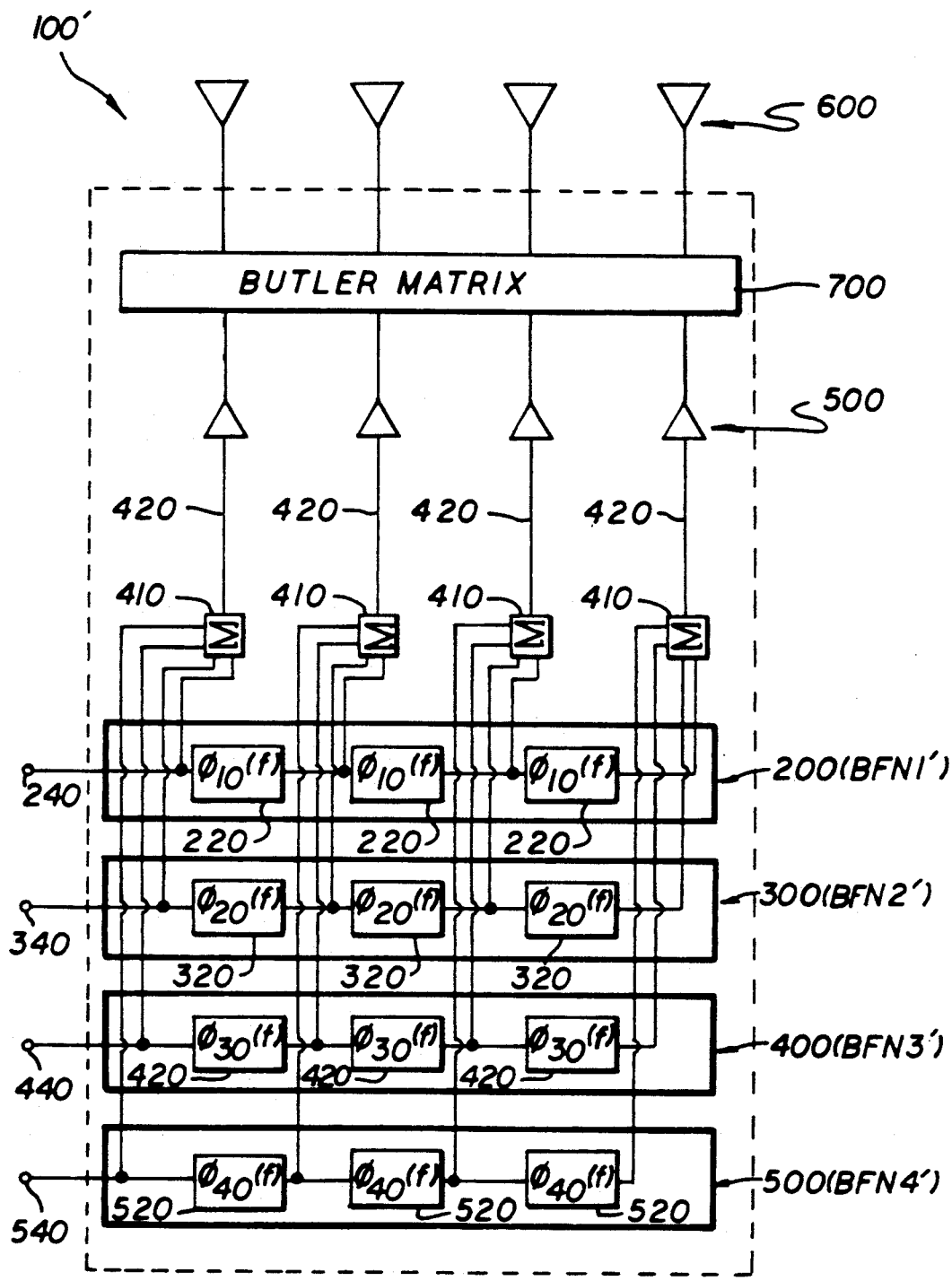
FIG. 7 is a block diagram representation of an antenna system in which an embodiment of the improved antenna beam forming system of the present invention includes a Butler matrix.

FIG. 7 shows a presently preferred embodiment of the improved antenna beam forming system 100' of the present invention. The system 100' is substantially identical to the system 100 (FIG. 4) with the exception of the further inclusion of an array of amplifying elements 500 and a Butler matrix 700. As is discussed in the previously cited, (copending) application STEERABLE BEAM ANTENNA SYSTEM USING BUTLER MATRIX, a Butler matrix approximates a spatial Fourier transform upon a set of input signals provided thereto. In the embodiment of FIG. 7, the Butler matrix 700 provides an approximation of the Fourier transformation of the signals on the lines 420 to an array of radiating elements 600. The arrays 500 and 600 are substantially identical to the arrays 50 and 60 shown in FIG. 1. In this manner the Butler matrix 700 allows for a simplification in a reflector arrangement (not shown) which is used to focus radiation emitted by the array 600. Additionally, the frequency response of the Butler matrix 700 enables the networks 200, 300, 400 and 500 to be designed to allow the uniform carrier frequency access described above.

Figure 8:
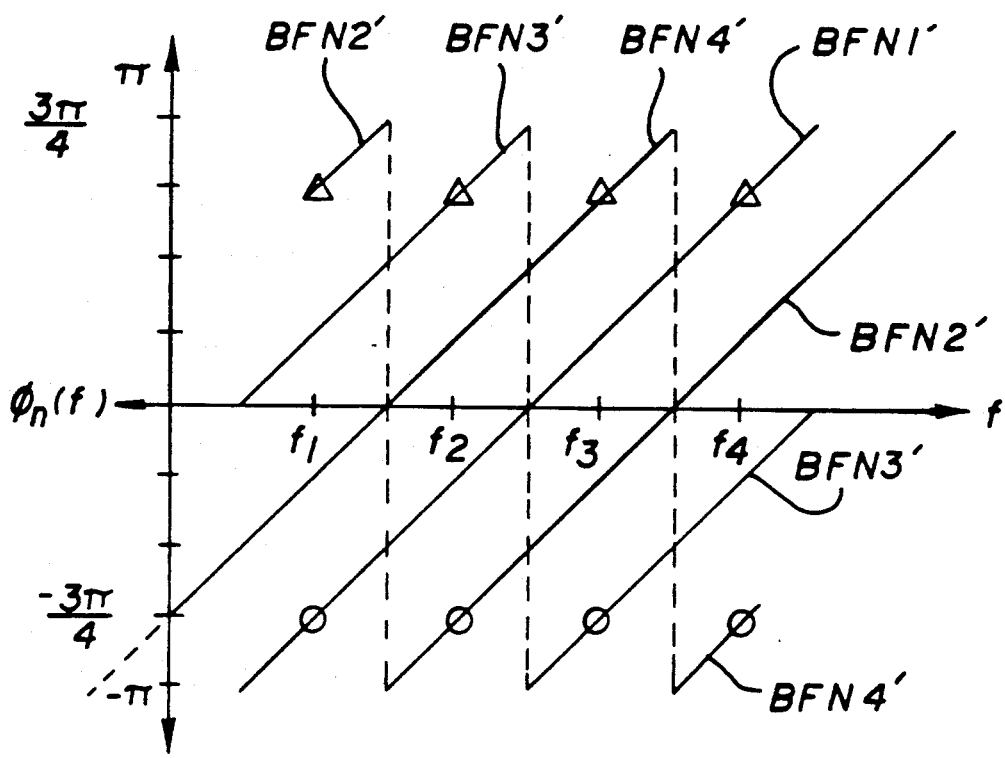
FIG. 8 is a graphical representation of the phase difference between adjacent .ports as a function of frequency provided by the embodiment of the improved antenna beam forming system shown in FIG. 7.

As is well known, the Butler matrix 700 treats all phase progressions between signals on adjacent lines 420 as being within the range -pi to pi radians. That is, the matrix 700 responds to an input phase progression of 3/2 pi as if it were $-\frac{1}{2}$ pi, and so on. Hence, as the input phase progression advances beyond pi the progression will "wrap around" so as to remain within the range -pi to pi. For example, FIG. 8 shows a possible composite frequency response representation of the system 100'. The effect of the wrap around frequency response of the Butler matrix 700 is denoted by the dashed lines in FIG. 8.

Figure 9:
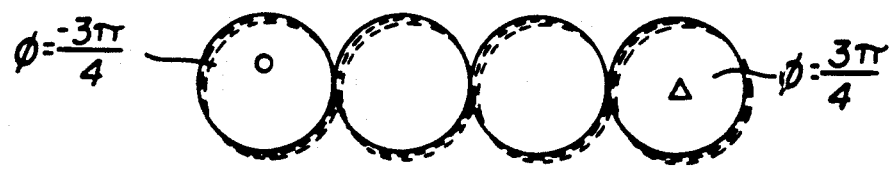
FIG. 9 is an illustrative representation of a virtual beam footprint pattern generated by beams formed by the improved beam forming system of FIG. 7.

FIG. 9 shows a virtual beam footprint pattern generated by the system 100' having the frequency response given in FIG. 8. In particular, the pattern of FIG. 9 results from the application of a set of carrier signals having frequencies $f_1$, $f_2$, $f_3$ and $f_4$ to each of the networks BFN1', BFN2', BFN3' and BFN4'. The pattern of FIG. 9 includes four sets of coincident beam footprints, each set having four individual virtual beams. The far left and far right footprint sets correspond to an input phase progression of signals into the Butler matrix 700 of $-\frac{3}{4}$ pi and $+\frac{3}{4}$ pi, respectively. In FIG. 8, the triangular markers allow identification of the particular beam forming networks (i.e. BFN1', BFN2', BFN3' or BFN4') responsible for generation of an input phase progression of $+\frac{3}{4}$ pi at each of the frequencies $f_1$, $f_2$, $f_3$, and $f_4$. Similarly, the circular markers allow identification of the beam forming networks which induce an input phase progression of $-\frac{3}{4}$ pi to the Butler matrix 700 at the indicated frequencies. It should be obvious that a user positioned within any of the four footprint sets of FIG. 9 has uniform access to each of the frequencies $f_1$, $f_2$, $f_3$, and $f_4$.

As users positioned within any of the four sets of footprints shown in FIG. 9 have access to the full spectrum of carrier frequencies applied to the system 100', the virtual beam pattern of FIG. 9 would be desirable in applications having highly concentrated user distributions. Alternatively, in certain instances it may be desirable to distribute the spectrum of available carrier frequencies over a larger coverage area. As is discussed immediately below, it is an additional feature of the present invention that access to a desired portion of an available frequency spectrum may occur from within such an extended coverage area.

Figure 10:
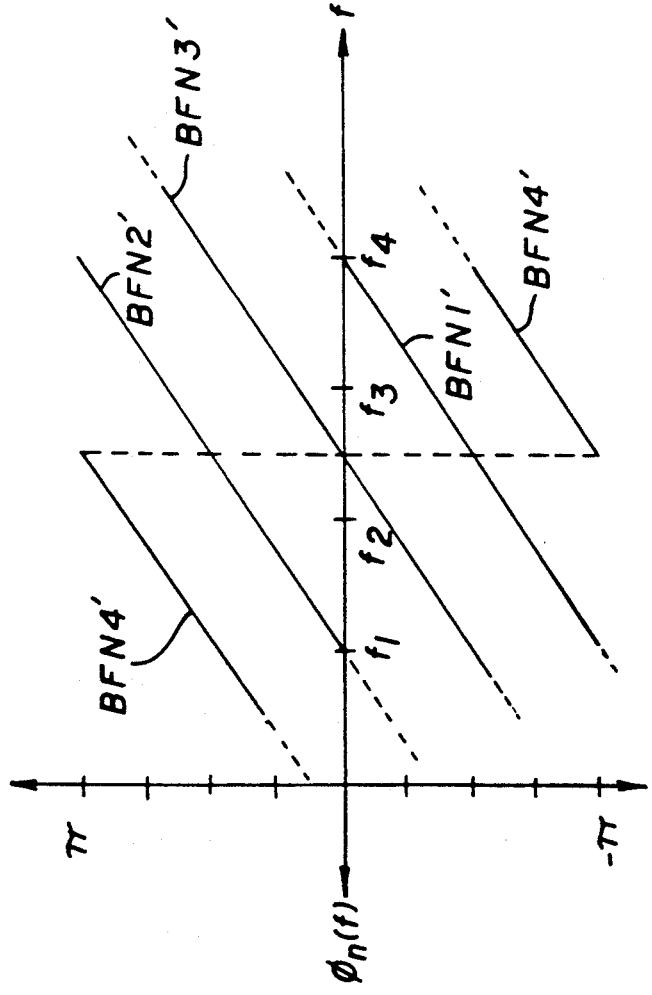
FIG. 10 is a graphical representation of an alternate phase response provided by the embodiment of the improved antenna beam forming system of FIG. 7.
Figure 11:
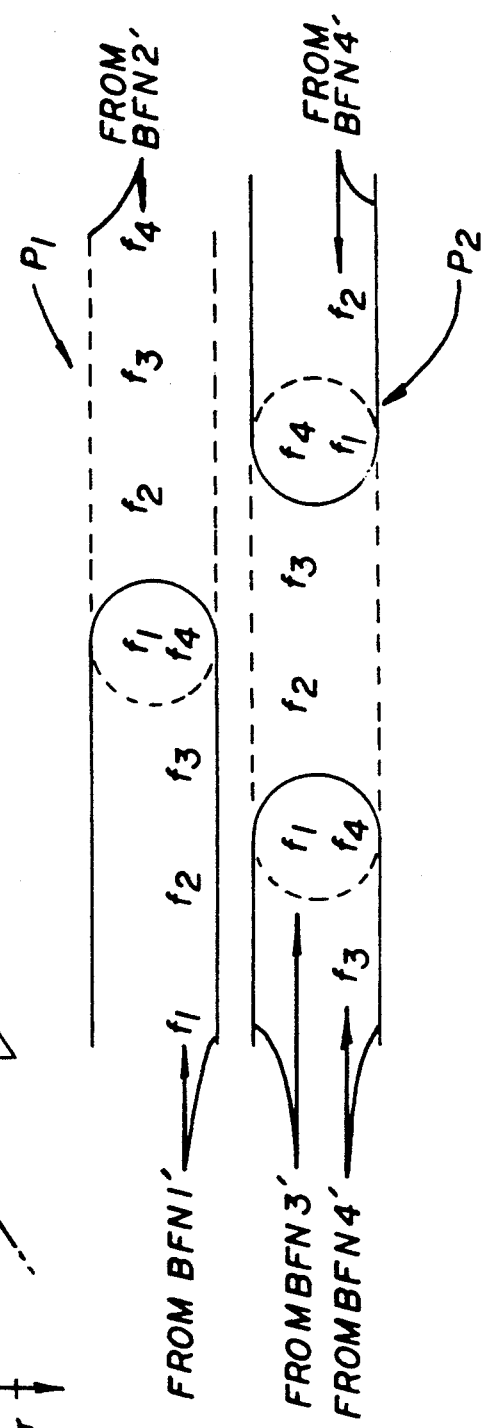
FIG. 11 is a partially separated illustrative representation of a virtual beam footprint pattern generated by an embodiment of the improved antenna beam forming system of the present invention having the phase response shown in FIG. 10.

FIG. 10 is a modification of the phase response shown in FIG. 8 which allows the system 100' to provide coverage to a relatively larger area than that shown in FIG. 9. For example, the system 100' represented by FIG. 10 generates the virtual beam footprint shown in FIG. 11 in response to application to the system 100' of a set of frequencies between $f_1$ and $f_4$. The patterns $P_1$ and $P_2$ shown in FIG. 11 are in actuality superimposed over an identical coverage area but are shown separately for clarity. The virtual beam pattern $P_1$ is generated in response to the networks BFN1' and BFN2'. Similarly, the pattern $P_2$ is generated in response to the networks BFN3' and BFN4'.

As was noted previously, in the general case the set of carrier frequencies applied to the network 100' will be a plurality of narrowly spaced frequencies between $f_1$ and $f_4$ as opposed to a set comprising only the individual frequencies $f_1$, $f_2$, $f_3$, and $f_4$. Hence, in the general case a user at position X in FIG. 10 will have access to ranges of frequencies surrounding $f_1$ and $f_4$ and also to a range of frequencies between $f_2$ and $f_3$. As is evident upon inspection of FIGS. 10 and 11, the carrier frequencies surrounding $f_1$ and $f_4$ are available to a user at position X via virtual beams generated by the networks BFN4' and BFN3', respectively. Similarly, access from position X to the range of frequencies between $f_2$ and $f_3$ is achieved through the network BFN1'.

Additionally, a user at position Y in FIG. 11 has access to substantially the same ranges of carrier frequencies as does the user at position X. That is, frequencies surrounding $f_1$ and $f_4$ and within a range between $f_2$ and $f_3$ are provided by the networks BFN3', BFN4' and BFN2', respectively. As should be obvious from the above, the selection of the ranges of carrier frequencies applied to the networks BFN1', BFN2', BFN3' and BFN4' allows adjustment in the virtual beam power illuminating given areas within the coverage region shown in FIG. 11. For example, applying a range of carrier frequencies surrounding $f_1$ and $f_4$ only to the networks BFN3' and BFN4' would result in all of the available virtual beam power being concentrated near location Y. In this manner the system 100' may respond to changes in the distribution of users within a coverage area.

Thus the present invention has been described with reference to particular embodiments in connection with a particular application. Those having ordinary skill in the art and access to the teachings of the present invention will recognize additional modifications and applications within the scope thereof. For example, the base responses of the delay elements 22, 32, 220, 320, 420 and 520 may be altered to generate virtual beam patterns appropriate for particular applications. Similarly, the invention is not limited to the particular arrangements of the beam forming networks 200, 300, 400 and 500 in conjunction with the Butler matrix 700 disclosed herein. Those skilled in the art may be aware of other devices for approximating a Fourier transform which may be suitable for inclusion in alternative embodiments of the present invention. Additionally, the number of beam forming networks or delay elements included therein may be changed without departing from the scope of the present invention.

It is therefore contemplated by the appended claims to cover any and all such applications, modifications and embodiments.

Accordingly,

What is claimed is:

1. An improved antenna beam forming system for providing first and second contemporaneous electromagnetic beams overlapping at a common surface comprising:

first beam forming network means for providing a first set of signals, said first beam forming network means including first phase shifting means with a first phase shifter having a first phase response as a function of frequency for providing a first phase relationship among said first set of signals in response to a first carrier signal of a first frequency;

second beam forming network means for providing a second set of signals, said second beam forming network means including second phase shifting means with a second phase shifter having a second phase response as a function of frequency for providing said first phase relationship among said second set of signals in response to a second carrier signal of a second frequency, said first and second phase responses of said first and second respective phase shifters being substantially identical and offset in frequency by the difference of said first and second frequencies;

summing means connected to the outputs of the first phase shifter and the second phase shifter for summing the outputs thereof to provide a third set of signals; and phased array means for transmitting said third set of signals to provide said first and second contemporaneous beams.

2. The invention of claim 1 including spatial transformation means for at least partially conducting a spatial transformation of the amplitude and phase distribution of said third set of signals to provide a fourth set of signals.

3. The improved antenna beam forming system of claim 2 wherein said spatial transformation is either a Fourier transform or an inverse Fourier transform.

4. The improved antenna beam forming system of claim 2 wherein said spatial transformation means includes a Butler matrix.

5. A method for providing first and second contemporaneous electromagnetic beams overlapping at a common surface including the steps of:

a) providing a first set of signals having a first phase response as a function of frequency and a first phase relationship in response to a first carrier signal of a first frequency;

b) providing a second set of signals having a second phase response as a function of frequency and said first phase relationship among said second set of signals in response to a second carrier signal of a second frequency, said first and second phase responses being substantially identical and offset in frequency by the difference of said first and second frequencies;

c) summing respective signals from the first and second sets of signals to provide a third set of signals; and d) transmitting said third set of signals to provide said first and second contemporaneous beams.

* * * * *